333# United States Patent Office 3,296,571
Patented Jan. 3, 1967

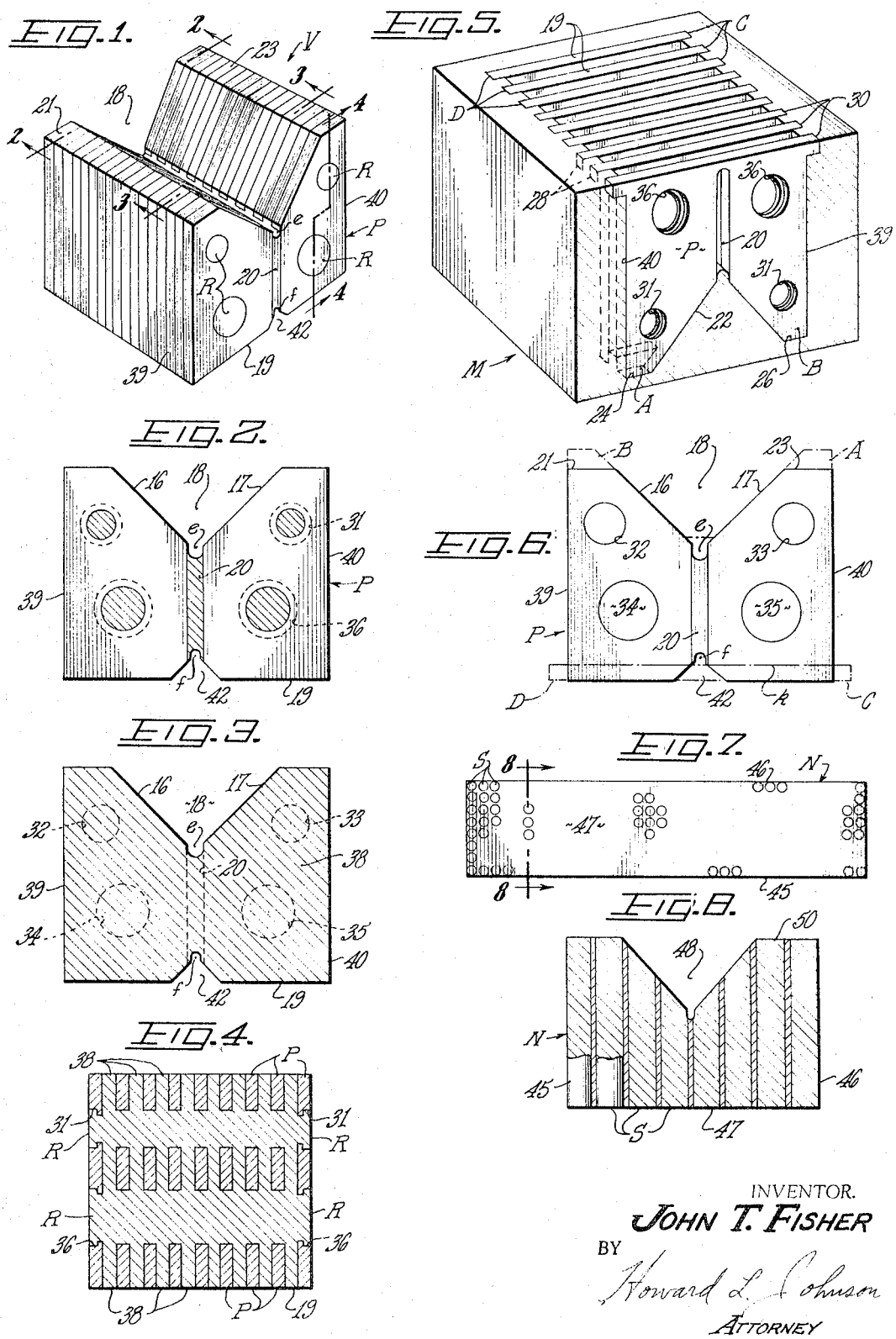

3,296,571
WORKHOLDING BLOCKS FOR MAGNETIC
CHUCK
John T. Fisher, 6325 W. 85th Place,
Los Angeles, Calif. 90045
Filed Mar. 29, 1965, Ser. No. 443,380
3 Claims. (Cl. 335—286)

This invention relates to magnetizable workholding blocks for use with magnetic chucks, and to a method or process for making such blocks. Commonly, magnetizable blocks are used to firmly secure a magnetizable workpiece in predetermined alignment so that various grinding or machining operations can be performed on it as required. The block is placed atop a magnetic chuck which has a series of adjacent plus and minus poles which can be activated and deactivated by the operator. The series may be either permanent magnets or electromagnets. When current is flowed through an energizing coil the electromagnets are made active. Alternately, the poles of permanent magnets in the chuck can be shorted to inactivate their holding force, and such action reversed to activate them.

A typical magnetic chuck or table is formed by closely juxtaposed ferromagnetic plates or sheets placed upstanding and magnetically insulated from each other; they are given opposite polarities by the magnetizing force. The top edges of such sheets are disposed collectively as a planar, generally horizontal surface. A workholding block which is supported on this surface and aligned with such poles is forceably held to the magnetic chuck, and the block in turn serves to anchor a magnetizable workpiece which it cradles or otherwise contacts, the magnetic flux or lines of force passing through the workpiece. For example, the block may be formed with a V-groove in its upper face which thus separates two halves of the block which are of opposite polarity. However, in order to obtain maximum holding force of the block (or of the workpiece which it supports) it has been recognized that it should be aligned with the magnetic field or poles of the chuck, since the two halves of a V-block are each magnetized as a unit; for example note U.S. Patent 2,449,255. Instead of a V-block, the workpiece may be held between a pair of parallel blocks which are thus completely physically separated and hence each magnetizable as an individual unit.

By the present invention, however, a plurality of magnetizable units (such as plates or rods) are cast, spaced apart, into a block formed by a matrix of non-magnetizable material, and a row of such units is divided or magnetically-separated into two parts or halves along the length of the block (in part by means of a workholding surface such as a V-groove). Such a laminated block need not now be precisely aligned with the magnetic flux on the chuck, but may simply be placed on the chuck at any parallel rotational position in respect to such flux. This is because the block, or the two halves of a V-block, are no longer each magnetized as a whole, but the individual units of each (split) row are separately magnetizable. Thus, in whatever position of horizontal rotation the block is placed on the chuck, some units are automatically aligned with the field. The magnetizable workpiece in the V-groove then bridges the magnetically-separated parts of the block and acts to channel the magnetic flux between the two halves or parts in the strongest holding cross-flow position (which need not be the shortest line between corresponding units of the two parts). In other words, the holding flux need not pass straight across the groove and yield only low holding power as in the past when the groove (or block) was not generally aligned with the flux; it can exert its force across the groove through the workpiece from one side of the block to the other, corresponding to the magnetic field of the chuck. This is a very practical advantage of considerable value.

It is an object of the invention to provide such magnetizable, laminated, workholding blocks wherein the magnetizable units of each cross-row are laterally separated into at least two parts which are individually magnetizable and thus adapted to concentrate lines of flux through a bridging workpiece so as to magnetically hold the same regardless of the orientation of the block on the chuck. Such construction embodies preformed metal rods or plates (e.g. steel) as the magnetizable units, which units are separated across both the width and length of a cast block by a solidified, lower-melting matrix of non-magnetizable material such as plastic (e.g. epoxy resin) or metal (e.g. aluminum or zinc). Further objects are to gain the advantages set forth and to achieve such other ends as will become evident.

In the drawings, which illustrate presently preferred embodiments of the invention:

FIGURE 1 is a perspective view of one of my magnetizable V-blocks which has been made of a series of bi-symmetrical, face-separated, steel plates, which have been cast in an aluminum block, and the two parts of each block then severed according to my process;

FIGURE 2 is an enlarged vertical sectional view through the V-block of FIGURE 1 along the line 2—2, the severed plate appearing in elevation;

FIGURE 3 is a similar view taken along the line 3—3 through a layer of solidified matrix material which separates individual plates and extends through the apertures thereof;

FIGURE 4 is a staggered, longitudinal vertical section taken through one row of separated plates of the V-block along the line 4—4, particularly showing the penetration of the matrix through the aligned transverse apertures of the series of plates;

FIGURE 5 is a perspective view of a mold (the forward end appearing in section) holding a face-to-face separated series of keyway-aligned, apertured plates which are individually located in the mold by laterally projecting tabs along their top edges and by vertically projecting edge tabs along the floor of the mold;

FIGURE 6 is an enlarged, face view of a single plate, inverted from its mold position, and particularly showing in phantom the several areas which are severed from the block after casting;

FIGURE 7 is a bottom plan view of another form of my magnetizable workholding block which is cast with units of rods instead of plates; and FIGURE 8 is a transverse sectional view, enlarged and inverted, taken along the line 8—8 of FIGURE 7 and particularly showing the parallel spaced relation of one row of upstanding rods, partially in elevation.

In casting the workholding V-block illustrated in FIGURES 1–5, there is utilized a series of flat-sided metal plates P of steel, or other magnetizable substance. Conveniently such a plate is bilaterally symmetrical and formed with a centered V-groove 18 extending downward from one edge, and with a medial slot 20 which incompletely divides the plates further into two approximately equal parts or halves. The slot may be initially closed at both ends or only at one end. Further extension of the slot 20 after the plates are cast into a block (by opening the closed end or ends, as subsequently explained) results in "magnetic" separation of the two similar halves of each plate; that is, they can then be individually magnetized by a magnet although the series or row of separated plate pairs are physically anchored in the cast matrix and the latter itself may even be an electrical conductor but not magnetizable, such as aluminum. Such flowable matrix fills and solidifies in open areas of each slot 20 and is also sandwiched between and binds together the successive plates of the series.

In fabrication, a plurality of identical or generally similar plates P are spaced apart face-to-face in a row within the rectangular-sided cavity of a fairly close-fitting mold M (FIG. 5). Internally, the mold is formed with a lengthwise-centered, V-wall 22, corresponding to the configuration of the V-groove 18 of each plate, and along each side edge of the V-wall 22 is a socket 24, 26 disposed to receive the positioning tabs A, B of the plate P. Sometimes these lower sockets 24, 26 may be absent.

The series of plates P, or the resulting V-block, is shown cast inverted from its normal use position. The upper, lengthwise edges of the mold cavity are also formed with rectangular sockets 28, 30, adapted to receive corresponding lateral positioning tabs C, D. The series of plates are thus disposed generally parallel, face-separated, and their medial slots 20 disposed in keyhole, or keyway, alignment along the length of the mold M or the resulting block V. Each symmetrical part or half of the severed plates P is also initially formed with a pair of transverse (conveniently circular) apertures 32, 33, 34, 35, which are likewise aligned along the length of the mold so that in each case they are adapted to receive an inserted bolt therethrough (the plates P in such case being separated by individual spacers) if the plates were not being cast into an integral block. However, neither the slots 20 nor the individual apertures need be exactly aligned for filling with matrix.

As seen particularly in FIGURE 4, the end plates of a series have their apertures 31, 36 countersunk, as by the holes being punched inward. The end plates may also be somewhat outwardly bowed. The cavity or open space in the mold M is then filled and solidified with the non-magnetizable material which is characterized by a lower melting point than that of the plates. For example, molten aluminum near 1300° F., or a little below its temperature of vaporization, is poured into the mold, and a pressure of perhaps 500 p.s.i. may be applied for 5 or 10 seconds to ensure elimination of voids. These conditions, however, are not critical, and this example is merely illustrative. If the mold and plates are preheated, the matrix can be poured at a lower temperature, but the plates are more difficult to place in the mold if they are hot. If synthetic, organic plastic is used as the matrix between the plates, it may be introduced in powder, granular, or liquid form and then fused, or cured, under the appropriate heat and pressure. Cooling contraction of the matrix material will draw the bowed end plates inward to a small extent, so that they are more nearly a planar surface, and hence less material need be ground away in rendering the ends of the block precisely perpendicular to the sides and bottom of the cast block V. At the same time, the countersunk configuration of the terminal apertures 31, 36 results in the material which solidifies therein assuming the shape of a rivethead R. This makes it more unlikely that the laminated "pack" of plates which has been cast into the block will be broken open by permitting the end plate to be loosened or "peeled off." Looking at the cast block as a whole, it will be seen that the flowable material has filled and solidified as a composite unit in the area of the open slots 20, connecting through the transverse apertures 31–36, as well as through the intermediate area 38 which is sandwiched between each pair of face-separated plates.

After the block V is removed from the mold M, its opposite sides 39, 40 are precision ground so as to be mutually parallel, as well as perpendicular to the bottom 19 and top walls 21, 23, which latter are likewise ground to the required precision. The two pair of plate tabs A, B and C, D may be severed from all plates of the block at the same time, that is, before the corresponding face is ground.

The row of embedded plates P also has the closed end or ends of the medial slots 20 (which area is now filled with the solidified matrix material) removed, as by cutting out from the block, the terminal areas e and f (FIGURES 2, 3, 6). This segments each steel plate (when initially bilaterally symmetrical) into two approximately identical or mirror-image parts, both of which of course still remain firmly embedded in the aluminum (or analogous) matrix. If desired, a bottom-face V-notch 42 can also be cut in the block (which notch may be large enough to cradle small-diameter cylindrical workpieces when the block is rested inverted upon top walls 21, 23). Such notch formation can simultaneously be used to open the adjacent end of notch 20 without separately or previously removing the area f. Alternatively, when the area e is initially open in the plate, the plate can be severed and the medial slot area 20 opened in the cast block by simply cutting off the marginal strip k of FIGURE 6. It will be appreciated also that instead of casting a row of several plates, and then cutting them apart after they are embedded in the block, discrete or already-severed halves could be placed in the mold if additional handling or aligning were not objectionable. It will be apparent that a severable plate need be held together at only one point (instead of both e and f) and a midpoint of the plate might be chosen for cross connection between the symmetrical halves except for the greater ease of severing the plates in the cast block when the cross connection(s) are near the edge. The broken line in FIGURE 6 indicates the cross bridge area which may initially close the slot 20 in the plate at the base of the V-groove 18.

The embodiment of the invention illustrated in FIGURES 7–8 employs as magnetizable material-units, steel rods or wires S (which from one block to another may have as great a difference in diameter as that of nails, say from $\frac{1}{16}$ to $\frac{1}{2}$ inch or more in diameter) in place of plates P. Conveniently, the upstanding rods S are arranged in parallel rows (but this is not essential) and are spaced from each other by a small clearance which is occupied by the aluminum or other non-magnetizable matrix 44 upon being cast into a block N. Parallel sides 45, 46 are ground perpendicular to the planar bottom 47. Pairs of such parallel-sided blocks can be placed on the magnetic chuck under opposite ends or sides of a workpiece, or alternatively, a workholding V-groove 48 can be formed lengthwise along the top planar face 50 of the block N generally centered between the parallel sides 45, 46.

It will be clear to those skilled in the art that various changes of construction and operation may be made within the scope of the present invention without departing from the spirit thereof, and therefore this disclosure is not to be limited by the precise details shown in the drawings or particularly described in the specification by way of example, but it is the intention to hereafter claim the invention broadly in its distinction from the prior art.

I claim:

1. A magnetizable work holding block adapted for use in any angular position on a magnetic chuck, said block comprising:
   (a) a plurality of perforated magnetizable plates, said plates being arranged in parallel spaced, coplanar pairs, the members of each pair having confronting but spaced edges;
   (b) and a homogeneous body of solidified non-magnetic material of lower melting temperature than said plates;
   (c) said body of material being disposed between pairs of said plates;
   (d) said body material also being disposed between the confronting edges of the members of each pair of plates;
   (e) the surfaces of said non-magnetic body material being flush with all the exposed edge surfaces of said plates;
   (f) said plates defining a first series of magnetic flux paths across the spaced edges of each pair and a second series of magnetic flux paths between the spaced pairs of plates.

2. A magnetizable work holding block according to claim 1 wherein:
(a) said plates have perforations and said body of material fills said perforations to connect the portions of the body of material disposed between the pairs of plates.

3. A magnetizable work holding block according to claim 1 wherein:
(a) at least one of the extremities of the confronting edges of each pair of plates is beveled to form a V-groove and said body of material is flush with the surfaces of the V-groove.

References Cited by the Examiner

UNITED STATES PATENTS

| | | | |
|---|---|---|---|
| 1,301,135 | 4/1919 | Karasick | 317—162 |
| 2,104,472 | 1/1938 | St. Clair et al. | 317—162 |
| 2,449,255 | 9/1948 | Sneckner | 317—162 |
| 2,475,456 | 7/1949 | Norlander | 317—162 |
| 2,501,803 | 3/1950 | Witbrod | 317—162 |
| 3,089,986 | 5/1963 | Gauthier | 317—162 |

BERNARD A. GILHEANY, *Primary Examiner.*

H. A. LEWITTER, *Assistant Examiner.*